United States Patent
Bing et al.

(10) Patent No.: US 8,161,935 B2
(45) Date of Patent: Apr. 24, 2012

(54) MULTI-PART PISTON FOR AN INTERNAL COMBUSTION ENGINE AND METHOD FOR ITS PRODUCTION

(75) Inventors: Karlheinz Bing, Remseck (DE); Frank Schnaiter, Ditzingen (DE)

(73) Assignee: MAHLE International GmbH, Stuttgart (DE)

( * ) Notice: Subject to any disclaimer, the term of this patent is extended or adjusted under 35 U.S.C. 154(b) by 434 days.

(21) Appl. No.: 12/456,828

(22) Filed: Jun. 23, 2009

(65) Prior Publication Data

US 2010/0108017 A1    May 6, 2010

(30) Foreign Application Priority Data

Nov. 6, 2008 (DE) .................. 10 2008 056 203

(51) Int. Cl.
     *F02F 3/00*        (2006.01)
     *F02F 3/22*        (2006.01)
(52) U.S. Cl. ..................................................... 123/193.6
(58) Field of Classification Search .............. 123/193.6, 123/41.35; 29/888.04; 92/186, 206
See application file for complete search history.

(56) References Cited

U.S. PATENT DOCUMENTS

| 6,557,514 | B1 * | 5/2003 | Gaiser | 123/193.6 |
| 6,763,758 | B2 | 7/2004 | Kemnitz et al. | |
| 2007/0079775 | A1 * | 4/2007 | Lin et al. | 123/41.35 |
| 2008/0011262 | A1 * | 1/2008 | Scharp et al. | 123/193.6 |
| 2008/0060514 | A1 * | 3/2008 | Scharp | 92/221 |
| 2008/0121204 | A1 * | 5/2008 | Scharp | 123/193.6 |
| 2009/0007880 | A1 * | 1/2009 | Messmer | 123/193.6 |
| 2009/0071001 | A1 * | 3/2009 | Kondoh et al. | 29/888.04 |
| 2009/0139481 | A1 * | 6/2009 | Messmer | 123/193.6 |
| 2009/0260593 | A1 * | 10/2009 | Messmer | 123/193.6 |

FOREIGN PATENT DOCUMENTS

EP      1 483 493      12/2004

\* cited by examiner

*Primary Examiner* — M. McMahon
(74) *Attorney, Agent, or Firm* — Collard & Roe, P.C.

(57) ABSTRACT

A method for producing a multi-part piston for an internal combustion engine and the piston itself, which has an upper piston part and a lower piston part, each having an inner and an outer support element, which elements delimit an outer circumferential cooling channel and an inner cooling chamber. The inner support element of the upper piston part and/or the inner support element of the lower piston part have at least one recess on their surface. The upper piston part and the lower piston part are connected with one another by pressure welding.

11 Claims, 2 Drawing Sheets

MULTI-PART PISTON FOR AN INTERNAL COMBUSTION ENGINE AND METHOD FOR ITS PRODUCTION

CROSS REFERENCE TO RELATED APPLICATIONS

Applicants claim priority under 35 U.S.C. 119 of German Application No. 10 2008 056 203.3 filed Nov. 6, 2008.

BACKGROUND OF THE INVENTION

1. Field of the Invention

The present invention relates to a multi-part piston for an internal combustion engine, having an upper piston part and a lower piston part. The upper piston part and the lower piston part each have an inner and an outer support element, which elements delimit an outer circumferential cooling channel and an inner cooling chamber. The present invention furthermore relates to a method for the production of such a piston.

2. The Prior Art

Multi-part pistons have the great advantage that the upper piston part and the lower piston part can consist of different materials. The upper piston part is generally produced from a particularly wear-resistant material, particularly one that is heat-resistant, but relatively heavy, while the lower piston part is generally produced from a light-metal material that is less wear-resistant, in order to save weight. Furthermore, the outer circumferential cooling channel and the inner cooling chamber are connected with one another by bores that are made in the inner support elements. They serve as overflow bores for the cooling oil, which can pass from the outer cooling channel into the inner cooling chamber, and vice versa, on this path, and can flow away in the direction of the piston crown.

In this regard, the connection between the upper piston part and lower piston part causes problems, as is explained in detail in European Patent No. EP 1 483 493 B1. The upper piston part and the lower piston part can be welded to one another, for example, or screwed together with one another. Each of these connection techniques has specific advantages and disadvantages. The preferred joining method is friction welding, particularly if the upper piston part and/or the lower piston part are produced from a steel material. However, friction welding has the disadvantage that great burr formation accompanies the joining process. This has the result that the bores that connect the outer circumferential cooling channel and the inner cooling chamber with one another can only be introduced after joining. Otherwise, there is the risk that bores made before joining will be partially or completely closed up during the friction-welding process, as the result of the strong burr formation. However, introducing the bores afterwards is very complicated.

SUMMARY OF THE INVENTION

It is therefore an object of the present invention to provide a piston as well as a simplified method for its production, whereby the piston has a stable connection between upper piston part and lower piston part.

This object is accomplished according to the invention, by a piston having at least one recess on a surface of an inner support element of the upper piston part and/or the inner support element of the lower piston part. The upper piston part and the lower piston part are connected with one another by pressure welding. In the method for producing the piston, an upper piston part and a lower piston part are produced, then a recess is introduced into the surface of the inner support element of the upper piston part and/or of the lower piston part, and finally, the upper piston part and the lower piston part are connected with one another by pressure welding.

According to the invention, the bores that serve as overflow bores for the cooling oil are therefore worked into at least one of the components before the components are joined. This takes place in the form of recesses of any desired type, shape, and size, which into the surface of the inner support element either of the upper piston part or of the lower piston part or of both components. During subsequent pressure welding, the components are heated along the joining surfaces in known manner, and joined together by pressing, i.e. by the action of mechanical force. In this connection, the recesses are essentially completely maintained as bores between the cooling channel and cooling chamber, so that the cooling oil can flow in an unhindered manner between the outer circumferential cooling channel and the inner cooling chamber.

Complicated introduction of the bores after joining of the components is therefore eliminated. The piston according to the invention and the method according to the invention, respectively, thus represent a significant simplification as compared with the state of the art. This is accompanied by increased economic efficiency, i.e. a clear reduction in costs.

Of course, two or more recesses can also be provided, which can optionally be provided on the upper piston part or on the lower piston part or on both components.

If both the inner support element of the upper piston part and also the inner support element of the lower piston part have at least one recess on their surface, these can optionally be positioned to coincide or align with each other before joining, so that a single bore having an increased diameter is obtained from the overlapping recesses.

The recesses can be worked into the components by forging or machining, for example milling.

The upper piston part and/or the lower piston part can be cast parts or forged parts, and can be produced, for example, from a steel material, particularly forged. In the latter case, it is practical to introduce the recesses during forging of the parts.

Inductive resistance welding is a particularly good possibility for the joining method.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

DETAILED DESCRIPTION OF THE PREFERRED EMBODIMENT

Figure 1:
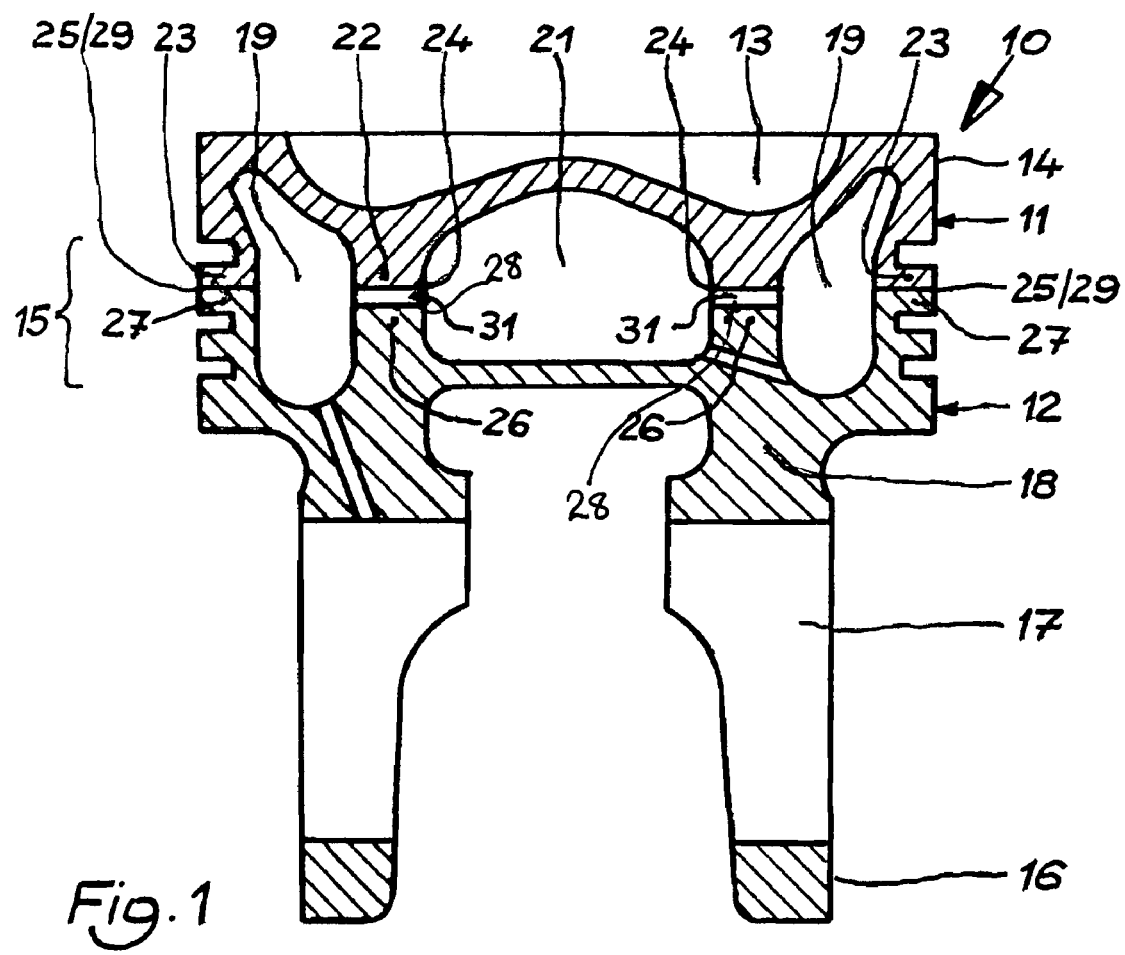
FIG. 1 is a section through an exemplary embodiment of a piston according to the invention.

FIG. 1 shows an exemplary embodiment of a piston 10 according to the invention, which is forged from a steel material. Piston 10 is composed of an upper piston part 11 and a lower piston part 12. Upper piston part 11 has a combustion bowl 13, a circumferential top land 14, and a circumferential ring belt 15. Lower piston part 12 has a piston skirt 16, pin bores 17 for accommodating a piston pin, and pin bosses 18 that are connected with piston skirt 16. Upper piston part 11 and the lower piston part 12 form a circumferential outer cooling channel 19 and a central inner cooling chamber 21.

Upper piston part 11 has an inner support element 22 and an outer support element 23. Inner support element 22 is disposed on the underside of upper piston part 11, circumferentially, in ring shape, and has a surface 24 that serves as a joining surface. Inner support element 22 furthermore forms part of the circumferential wall of inner cooling chamber 21. Outer support element 23 of upper piston part 11 is formed from ring belt 15, in the exemplary embodiment, and has a surface 25 that serves as a joining surface.

Lower piston part 12 also has an inner support element 26 and an outer support element 27. Inner support element 26 is disposed on the top of lower piston part 12, circumferentially, and has a surface 28 that serves as a joining surface. Inner support element 26 furthermore forms part of the circumferential wall of inner cooling chamber 21. Outer support element 27 is formed from ring belt 15, and has a surface 29 that serves as a joining surface.

Figure 2:
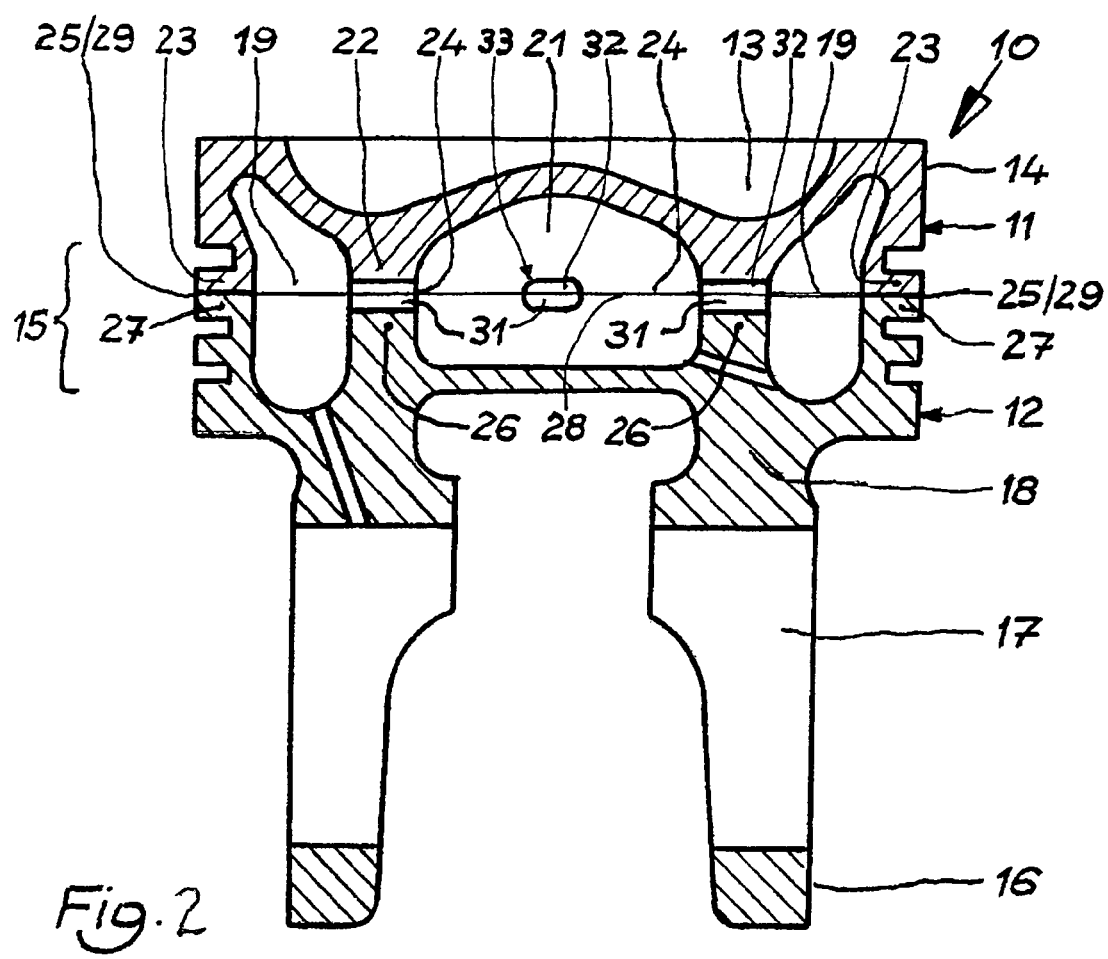
FIG. 2 shows a section through a second embodiment of a piston according to the invention.

In the embodiment shown in FIG. 1, the surface 28 of inner support element 26 of lower piston part 12 is provided with recesses 31. In this embodiment, five recesses 31 are uniformly distributed over surface 28. It is practical if recesses 31 are introduced during forging of lower piston part 12. Of course, recesses 31 can also be introduced into surface 24 of inner support element 22 of the upper piston part 11. Recesses 31 can also be introduced into both surfaces 24, 28, as shown in the embodiment of FIG. 2. In FIG. 2, all of the features are identical to those of FIG. 1 except that the recesses are in both the upper and lower piston parts.

Upper piston part 11 and lower piston part 12 are joined, in the embodiments of FIGS. 1 and 2, by inductive resistance pressure welding. For this purpose, surfaces 24, 25 and 28, 29, respectively, were inductively heated until the material reached the appropriate flow capacity, and subsequently pressed together with one another.

In the embodiment of FIG. 1, recesses 31 in the built-in condition serve as overflow bores for the cooling oil circulating in outer cooling channel 19 and in inner cooling chamber 21.

If recesses 31 in the surface 28 of lower part 12 as well as recesses 32 in surface 24 of upper part 11 are provided, as shown in FIG. 2, they can be brought into coverage to align with one another before joining, to create overflow bores 33 having a particularly large diameter.

Accordingly, while only a few embodiments of the present invention have been shown and described, it is obvious that many changes and modifications may be made thereunto without departing from the spirit and scope of the invention.

What is claimed is:

1. A multi-part piston for an internal combustion engine, comprising:
    an upper piston part having an inner support element and an outer support element; and
    a lower piston part having an inner support element and an outer support element,
    wherein said support elements delimit an outer circumferential cooling channel and an inner cooling chamber, wherein both the inner support element of the upper piston part and the inner support element of the lower piston part have at least one recess on their surfaces, said at least one recess on the upper piston part and said at least one recess on the lower piston part being positioned to align with each other, and wherein the upper piston part and the lower piston part are connected with one another by means of pressure welding.

2. The piston according to claim 1, wherein there are two or more of said recesses on each of the upper and lower piston parts.

3. The piston according to claim 1, wherein at least one of the upper piston part and the lower piston part are forged parts.

4. The piston according to claim 1, wherein at least one of the upper piston part and the lower piston part are produced from a steel material.

5. The piston according to claim 1, wherein the upper piston part and the lower piston part are connected with one another by inductive resistance pressure welding.

6. A method for the production of a multi-part piston for an internal combustion engine, having an upper piston part and a lower piston part, wherein the upper piston part and the lower piston part each have an inner and an outer support element, which elements delimit an outer circumferential cooling channel and an inner cooling chamber, comprising the following method steps:
    producing the upper piston part and the lower piston part;
    introducing at least one recess into a surface of the inner support element of the upper piston part and introducing at least one recess into the surface of the inner support element of the lower piston part;
    positioning said recesses so that they are aligned with one another before pressure welding; and
    connecting the upper piston part and the lower piston part by pressure welding.

7. The method according to claim 6, wherein two or more recesses are introduced into the surface of the inner support element of the upper piston part and of the lower piston part.

8. The method according to claim 6, wherein the recesses are introduced by forging or machining.

9. The method according to claim 6, wherein at least one of the upper piston part or the lower piston part are produced by means of forging.

10. The method according to claim 6, wherein at least one of the upper piston part and the lower piston part are produced from a steel material.

11. The method according to claim 6, wherein the upper piston part and the lower piston part are connected with one another by inductive resistance pressure welding.

* * * * *